US012580883B2

(12) United States Patent
Lawson et al.

(10) Patent No.: US 12,580,883 B2
(45) Date of Patent: Mar. 17, 2026

(54) SYSTEM AND METHOD FOR ENABLING REAL-TIME EVENTING

(71) Applicant: Twilio Inc., San Francisco, CA (US)

(72) Inventors: Jeffrey Lawson, San Francisco, CA (US); John Wolthuis, San Francisco, CA (US); Evan Cooke, San Francisco, CA (US); Jeffrey Comer, Mountain View, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/305,047

(22) Filed: Jun. 29, 2021

(65) Prior Publication Data

US 2021/0328963 A1 Oct. 21, 2021

Related U.S. Application Data

(63) Continuation of application No. 16/361,925, filed on Mar. 22, 2019, now Pat. No. 11,088,984, which is a
(Continued)

(51) Int. Cl.
*H04L 51/04* (2022.01)
*G06F 9/54* (2006.01)
(Continued)

(52) U.S. Cl.
CPC ............. *H04L 51/52* (2022.05); *G06F 9/542* (2013.01); *H04L 51/04* (2013.01); *H04L 51/212* (2022.05);
(Continued)

(58) Field of Classification Search
CPC ... G06F 2209/544; G06F 9/542; H04L 51/04; H04L 51/212; H04L 51/214; H04L 51/52
See application file for complete search history.

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A1 3/1971
EP 0282126 A2 9/1988
(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.
(Continued)

*Primary Examiner* — Jason D Recek
(74) *Attorney, Agent, or Firm* — Schwegman Lundberg & Woessner, P.A.

(57) ABSTRACT

A method and system for real-time eventing including interacting with at least one configuration attribute according to instructions specified through an application programming interface (API); adding subscribers for an event channel; generating an event from operation of an application; publishing the event message to the event channel on an event router; processing the event message according to the
(Continued)

at least one configuration attribute; identifying a subscriber to the event channel; and sending the event from the event router to the subscriber.

20 Claims, 10 Drawing Sheets

Related U.S. Application Data continuation of application No. 15/936,670, filed on Mar. 27, 2018, now Pat. No. 10,270,734, which is a continuation of application No. 14/452,277, filed on Aug. 5, 2014, now Pat. No. 9,967,224, which is a continuation of application No. 13/170,056, filed on Jun. 27, 2011, now Pat. No. 8,838,707.

(60) Provisional application No. 61/358,732, filed on Jun. 25, 2010.

(51) Int. Cl.
H04L 51/212 (2022.01)
H04L 51/214 (2022.01)
H04L 51/52 (2022.01)

(52) U.S. Cl.
CPC ...... H04L 51/214 (2022.05); G06F 2209/544 (2013.01)

(56) References Cited

U.S. PATENT DOCUMENTS

| | | | |
|---|---|---|---|
| 5,581,608 A | 12/1996 | Jreij et al. | |
| 5,598,457 A | 1/1997 | Foladare et al. | |
| 5,867,495 A | 2/1999 | Elliott et al. | |
| 5,934,181 A | 8/1999 | Adamczewski | |
| 5,978,465 A | 11/1999 | Corduroy et al. | |
| 6,026,440 A | 2/2000 | Shrader et al. | |
| 6,034,946 A | 3/2000 | Roginsky et al. | |
| 6,094,681 A | 7/2000 | Shaffer et al. | |
| 6,138,143 A | 10/2000 | Gigliotti et al. | |
| 6,185,565 B1 | 2/2001 | Meubus et al. | |
| 6,192,123 B1 | 2/2001 | Grunsted et al. | |
| 6,206,564 B1 | 3/2001 | Adamczewski | |
| 6,223,287 B1 | 4/2001 | Douglas et al. | |
| 6,232,979 B1 | 5/2001 | Shochet | |
| 6,243,747 B1 * | 6/2001 | Lewis | H04L 41/0843 709/224 |
| 6,269,336 B1 | 7/2001 | Ladd et al. | |
| 6,317,137 B1 | 11/2001 | Rosasco | |
| 6,363,065 B1 | 3/2002 | Thornton et al. | |
| 6,373,836 B1 | 4/2002 | Deryugin et al. | |
| 6,425,012 B1 | 7/2002 | Trovato et al. | |
| 6,426,995 B1 | 7/2002 | Kim et al. | |
| 6,430,175 B1 | 8/2002 | Echols et al. | |
| 6,434,528 B1 | 8/2002 | Sanders | |
| 6,445,694 B1 | 9/2002 | Swartz | |
| 6,445,776 B1 | 9/2002 | Shank et al. | |
| 6,459,913 B2 | 10/2002 | Cloutier | |
| 6,463,414 B1 | 10/2002 | Su et al. | |
| 6,493,558 B1 | 12/2002 | Bernhart et al. | |
| 6,496,500 B2 | 12/2002 | Nance et al. | |
| 6,501,739 B1 | 12/2002 | Cohen | |
| 6,501,832 B1 | 12/2002 | Saylor et al. | |
| 6,507,875 B1 | 1/2003 | Mellen-Garnett et al. | |
| 6,571,245 B2 | 5/2003 | Huang et al. | |
| 6,574,216 B1 | 6/2003 | Farris et al. | |
| 6,577,721 B1 | 6/2003 | Vainio et al. | |
| 6,600,736 B1 | 7/2003 | Ball et al. | |
| 6,606,596 B1 | 8/2003 | Zirngibl et al. | |
| 6,614,783 B1 | 9/2003 | Sonesh et al. | |
| 6,625,258 B1 | 9/2003 | Ram et al. | |
| 6,625,576 B2 | 9/2003 | Kochanski et al. | |
| 6,636,504 B1 | 10/2003 | Albers et al. | |

| | | | |
|---|---|---|---|
| 6,662,231 B1 | 12/2003 | Drosset et al. | |
| 6,704,785 B1 | 3/2004 | Koo et al. | |
| 6,707,889 B1 | 3/2004 | Saylor et al. | |
| 6,711,129 B1 | 3/2004 | Bauer et al. | |
| 6,711,249 B2 | 3/2004 | Weissman et al. | |
| 6,738,738 B2 | 5/2004 | Henton | |
| 6,757,365 B1 | 6/2004 | Bogard | |
| 6,765,997 B1 | 7/2004 | Zirngibl et al. | |
| 6,768,788 B1 | 7/2004 | Langseth et al. | |
| 6,771,955 B2 | 8/2004 | Imura et al. | |
| 6,778,653 B1 | 8/2004 | Kallas et al. | |
| 6,785,266 B2 | 8/2004 | Swartz | |
| 6,788,768 B1 | 9/2004 | Saylor et al. | |
| 6,792,086 B1 | 9/2004 | Saylor et al. | |
| 6,792,093 B2 | 9/2004 | Barak et al. | |
| 6,798,867 B1 | 9/2004 | Zirngibl et al. | |
| 6,807,529 B2 | 10/2004 | Johnson et al. | |
| 6,807,574 B1 | 10/2004 | Partovi et al. | |
| 6,819,667 B1 | 11/2004 | Brusilovsky et al. | |
| 6,820,260 B1 | 11/2004 | Flockhart et al. | |
| 6,829,334 B1 | 12/2004 | Zirngibl et al. | |
| 6,831,966 B1 | 12/2004 | Tegan et al. | |
| 6,834,265 B2 | 12/2004 | Balasuriya | |
| 6,836,537 B1 | 12/2004 | Zirngibl et al. | |
| 6,842,767 B1 | 1/2005 | Partovi et al. | |
| 6,850,603 B1 | 2/2005 | Eberle et al. | |
| 6,870,830 B1 | 3/2005 | Schuster et al. | |
| 6,873,952 B1 | 3/2005 | Bailey et al. | |
| 6,874,084 B1 | 3/2005 | Dobner et al. | |
| 6,885,737 B1 | 4/2005 | Gao et al. | |
| 6,888,929 B1 | 5/2005 | Saylor et al. | |
| 6,895,084 B1 | 5/2005 | Saylor et al. | |
| 6,898,567 B2 | 5/2005 | Balasuriya | |
| 6,912,581 B2 | 6/2005 | Johnson et al. | |
| 6,922,411 B1 | 7/2005 | Taylor | |
| 6,928,469 B1 | 8/2005 | Duursma et al. | |
| 6,931,405 B2 | 8/2005 | El-shimi et al. | |
| 6,937,699 B1 | 8/2005 | Schuster et al. | |
| 6,940,953 B1 | 9/2005 | Eberle et al. | |
| 6,941,268 B2 | 9/2005 | Porter et al. | |
| 6,947,417 B2 | 9/2005 | Laursen et al. | |
| 6,947,988 B1 | 9/2005 | Saleh et al. | |
| 6,961,330 B1 | 11/2005 | Cattan et al. | |
| 6,964,012 B1 | 11/2005 | Zirngibl et al. | |
| 6,970,915 B1 | 11/2005 | Partovi et al. | |
| 6,977,992 B2 | 12/2005 | Zirngibl et al. | |
| 6,981,041 B2 | 12/2005 | Araujo et al. | |
| 6,985,862 B2 | 1/2006 | Strom et al. | |
| 6,999,576 B2 | 2/2006 | Sacra | |
| 7,003,464 B2 | 2/2006 | Ferrans et al. | |
| 7,006,606 B1 | 2/2006 | Cohen et al. | |
| 7,010,586 B1 | 3/2006 | Allavarpu et al. | |
| 7,020,685 B1 | 3/2006 | Chen et al. | |
| 7,039,165 B1 | 5/2006 | Saylor et al. | |
| 7,058,042 B2 | 6/2006 | Bontempi et al. | |
| 7,058,181 B2 | 6/2006 | Wright et al. | |
| 7,062,709 B2 | 6/2006 | Cheung | |
| 7,065,637 B1 | 6/2006 | Nanja | |
| 7,076,037 B1 | 7/2006 | Gonen et al. | |
| 7,076,428 B2 | 7/2006 | Anastasakos et al. | |
| 7,089,310 B1 | 8/2006 | Ellerman et al. | |
| 7,099,442 B2 | 8/2006 | Da Palma et al. | |
| 7,103,003 B2 | 9/2006 | Brueckheimer et al. | |
| 7,103,171 B1 | 9/2006 | Annadata et al. | |
| 7,106,844 B1 | 9/2006 | Holland | |
| 7,111,163 B1 | 9/2006 | Haney | |
| 7,136,932 B1 | 11/2006 | Schneider | |
| 7,140,004 B1 | 11/2006 | Kunins et al. | |
| 7,143,039 B1 | 11/2006 | Stifelman et al. | |
| 7,197,331 B2 | 3/2007 | Anastasakos et al. | |
| 7,197,461 B1 | 3/2007 | Eberle et al. | |
| 7,197,462 B2 | 3/2007 | Takagi et al. | |
| 7,197,544 B2 | 3/2007 | Wang et al. | |
| D540,074 S | 4/2007 | Peters | |
| 7,225,232 B2 | 5/2007 | Elberse | |
| 7,227,849 B1 | 6/2007 | Rasanen | |
| 7,245,611 B2 | 7/2007 | Narasimhan et al. | |
| 7,260,208 B2 | 8/2007 | Cavalcanti | |
| 7,266,181 B1 | 9/2007 | Zirngibl et al. | |

(56) References Cited

U.S. PATENT DOCUMENTS

| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,609,823 B2 | 10/2009 | Bermudez et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,822,594 B2 | 10/2010 | Haviv et al. |
| 7,875,836 B2 | 1/2011 | Imura et al. |
| 7,882,253 B2 | 2/2011 | Pardo-Castellote et al. |
| 7,890,543 B2 | 2/2011 | Hunt et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,539,097 B2 | 9/2013 | Maes |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |

(56)  References Cited

U.S. PATENT DOCUMENTS

| | | |
|---|---|---|
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,745,191 B2 | 6/2014 | Raleigh et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,967,224 B2 | 5/2018 | Lawson et al. |
| 10,270,734 B2 | 4/2019 | Lawson et al. |
| 11,088,984 B2 | 8/2021 | Lawson et al. |
| 11,936,609 B2 | 3/2024 | Lawson et al. |
| 12,244,557 B2 | 3/2025 | Lawson et al. |
| 12,289,282 B2 | 4/2025 | Lawson et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0004907 A1* | 1/2002 | Donahue ........... H04L 43/00 709/224 |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0016867 A1 | 2/2002 | Kampe et al. |
| 2002/0025819 A1 | 2/2002 | Cetusic et al. |
| 2002/0038340 A1 | 3/2002 | Whipple et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0076155 A1 | 4/2004 | Yajnik et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0021836 A1 | 1/2005 | Reed et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0144298 A1 | 6/2005 | Samuel et al. |

(56) References Cited

U.S. PATENT DOCUMENTS

| | | |
|---|---|---|
| 2005/0147088 A1 | 7/2005 | Bao et al. |
| 2005/0152286 A1 | 7/2005 | Betts et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0248194 A1 | 11/2006 | Mccanne et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2006/0287593 A1 | 12/2006 | Jaggu et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0050461 A1 | 3/2007 | Petry et al. |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0143442 A1* | 6/2007 | Zhang ................ H04L 67/1008 709/217 |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0197293 A1 | 8/2007 | Jalava et al. |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0184270 A1* | 7/2008 | Cole ..................... H04M 11/04 719/318 |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1* | 12/2008 | Hamilton ................ G06F 9/542 719/318 |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0138563 A1 | 5/2009 | Zhu et al. |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |

(56) References Cited

U.S. PATENT DOCUMENTS

| | | | |
|---|---|---|---|
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0005147 A1 | 1/2010 | Johnson, III et al. |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0274793 A1* | 10/2010 | Koskimies ............. G06Q 10/10 |
| | | 707/754 |
| 2010/0281108 A1 | 11/2010 | Cohen |
| 2010/0291910 A1 | 11/2010 | Sanding et al. |
| 2010/0312919 A1 | 12/2010 | Lee et al. |
| 2010/0322264 A1 | 12/2010 | Liimatta et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0107084 A1* | 5/2011 | Hubner .............. H04W 12/033 |
| | | 713/153 |
| 2011/0110366 A1 | 5/2011 | Moore et al. |
| 2011/0126201 A1* | 5/2011 | Iyer ........................ G06F 9/542 |
| | | 718/102 |
| 2011/0131293 A1 | 6/2011 | Mori |
| 2011/0143714 A1 | 6/2011 | Keast et al. |
| 2011/0145049 A1 | 6/2011 | Hertel et al. |
| 2011/0145842 A1 | 6/2011 | Tofighbakhsh et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276636 A1 | 11/2011 | Cheng et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0036476 A1 | 2/2013 | Roever et al. |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0025503 A1 | 1/2014 | Meyer et al. |

(56) References Cited

U.S. PATENT DOCUMENTS

| | | | |
|---|---|---|---|
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0344388 A1 | 11/2014 | Lawson et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2016/0011758 A1 | 1/2016 | Dornbush et al. |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0239770 A1 | 8/2016 | Batabyal et al. |
| 2017/0339283 A1 | 11/2017 | Chaudhary et al. |
| 2018/0212919 A1 | 7/2018 | Lawson et al. |
| 2019/0319909 A1 | 10/2019 | Lawson et al. |
| 2021/0243151 A1 | 8/2021 | Lawson et al. |
| 2021/0243152 A1 | 8/2021 | Lawson et al. |
| 2021/0328964 A1 | 10/2021 | Lawson et al. |
| 2021/0400009 A1 | 12/2021 | Lawson et al. |

FOREIGN PATENT DOCUMENTS

| | | | |
|---|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 13/170,056, Examiner Interview Summary mailed Oct. 22, 2013", 3 pgs.

"U.S. Appl. No. 13/170,056, Non Final Office Action mailed Jun. 18, 2013", 16 pgs.

"U.S. Appl. No. 13/170,056, Notice of Allowance mailed May 6, 2014", 8 pgs.

"U.S. Appl. No. 13/170,056, Notice of Non-Compliant Amendment mailed Feb. 4, 2014", 2 pgs.

"U.S. Appl. No. 13/170,056, Preliminary Amendment filed May 6, 2013", 7 pgs.

"U.S. Appl. No. 13/170,056, Response filed Feb. 4, 2014 to Notice of Non-Compliant Amendment mailed Feb. 4, 2014", 12 pgs.

"U.S. Appl. No. 13/170,056, Response filed Oct. 18, 2013 to Non Final Office Action mailed Jun. 18, 2013", 14 pgs.

"U.S. Appl. No. 14/452,277, Examiner Interview Summary mailed Mar. 2, 2017", 3 pgs.

"U.S. Appl. No. 14/452,277, Examiner Interview Summary mailed Aug. 18, 2016", 3 pgs.

"U.S. Appl. No. 14/452,277, Examiner Interview Summary mailed Oct. 4, 2017", 2 pgs.

"U.S. Appl. No. 14/452,277, Final Office Action mailed Oct. 21, 2016", 13 pgs.

"U.S. Appl. No. 14/452,277, Non Final Office Action mailed May 23, 2016", 14 pgs.

"U.S. Appl. No. 14/452,277, Non Final Office Action mailed Jun. 21, 2017", 13 pgs.

"U.S. Appl. No. 14/452,277, Notice of Allowance mailed Dec. 27, 2017", 9 pgs.

"U.S. Appl. No. 14/452,277, Preliminary Amendment filed May 14, 2015", 7 pgs.

"U.S. Appl. No. 14/452,277, Response filed Jan. 23, 2017 to Final Office Action mailed Oct. 21, 2016", 9 pgs.

"U.S. Appl. No. 14/452,277, Response filed Aug. 16, 2016 to Non Final Office Action mailed May 23, 2016", 14 pgs.

"U.S. Appl. No. 14/452,277, Response filed Sep. 21, 2017 to Non Final Office Action mailed Jun. 21, 2017", 10 pgs.

"U.S. Appl. No. 15/936,670, Examiner Interview Summary mailed Sep. 12, 2018", 2 pgs.

"U.S. Appl. No. 15/936,670, Non Final Office Action mailed Aug. 10, 2018", 13 pgs.

"U.S. Appl. No. 15/936,670, Notice of Allowance mailed Dec. 3, 2018", 8 pgs.

"U.S. Appl. No. 15/936,670, Preliminary Amendment filed Jun. 21, 2018", 5 pgs.

"U.S. Appl. No. 15/936,670, PTO Response to Rule 312 Communication mailed Mar. 15, 2019", 2 pgs.

"U.S. Appl. No. 15/936,670, Response filed Sep. 26, 2018 to Non Final Office Action mailed Aug. 10, 2018", 13 pgs.

"U.S. Appl. No. 16/361,925, Examiner Interview Summary mailed Jun. 16, 2020", 3 pgs.

"U.S. Appl. No. 16/361,925, Final Office Action mailed Sep. 15, 2020", 13 pgs.

"U.S. Appl. No. 16/361,925, Non Final Office Action mailed Apr. 3, 2020", 12 pgs.

"U.S. Appl. No. 16/361,925, Notice of Allowance mailed Apr. 13, 2021", 9 pgs.

"U.S. Appl. No. 16/361,925, Preliminary Amendment filed Jul. 9, 2019", 7 pgs.

"U.S. Appl. No. 16/361,925, Response filed Jun. 19, 2020 to Non Final Office Action mailed Apr. 3, 2020", 12 pgs.

"U.S. Appl. No. 16/361,925, Response filed Dec. 15, 2020 to Final Office Action mailed Sep. 15, 2020", 11 pgs.

(56)                    References Cited

OTHER PUBLICATIONS

"Archive Microsoft Office 365 Email I Retain Unified Archiving", GWAVA, Inc., Montreal, Canada, [Online] Retrieved from the Internet: <URL: http://www.gwava.com/Retain/Retain for_Office_365.php>, (2015), 4 pgs.

"Complaint for Patent Infringement", *Telinit Technologies, LLC* v. *Twilio Inc* 2:12-cv-663, (Oct. 12, 2012), 17 pgs.

"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

"U.S. Appl. No. 17/305,046, Preliminary Amendment filed Jun. 30, 2021", 7 pgs.

"U.S. Appl. No. 17/305,049, Preliminary Amendment filed Jun. 30, 2021", 7 pgs.

"U.S. Appl. No. 17/302,124, Non Final Office Action mailed Nov. 25, 2022", 14 pgs.

"U.S. Appl. No. 17/302,125, Non Final Office Action mailed Nov. 25, 2022", 13 pgs.

"U.S. Appl. No. 17/305,046, Non Final Office Action mailed Dec. 7, 2022", 13 pgs.

"U.S. Appl. No. 17/305,049, Non Final Office Action mailed Jan. 3, 2023", 12 pgs.

"U.S. Appl. No. 17/302,124, Response filed Mar. 27, 2023 to Non Final Office Action mailed Nov. 25, 2022", 11 pgs.

"U.S. Appl. No. 17/302,125, Response filed Apr. 25, 2023 to Non Final Office Action mailed Nov. 25, 2022", 10 pgs.

"U.S. Appl. No. 17/305,049, Response filed May 2, 2023 to Non Final Office Action mailed Jan. 3, 2023", 11 pgs.

"U.S. Appl. No. 17/305,046, Response filed May 4, 2023 to Non Final Office Action mailed Dec. 7, 2022", 11 pgs.

"U.S. Appl. No. 17/302,125, Notice of Allowance mailed Nov. 1, 2023", 8 pgs.

"U.S. Appl. No. 17/305,049, Response filed Nov. 8, 2023 to Final Office Action mailed Aug. 8, 2023", 12 pgs.

"U.S. Appl. No. 17/305,046, Response filed Dec. 7, 2023 to Final Office Action mailed Aug. 7, 2023", 10 pgs.

"U.S. Appl. No. 17/302,124, Non Final Office Action mailed Dec. 14, 2023", 9 pgs.

"U.S. Appl. No. 17/302,124, Final Office Action mailed May 26, 2023", 10 pgs.

"U.S. Appl. No. 17/302,125, Final Office Action mailed May 31, 2023", 15 pgs.

"U.S. Appl. No. 17/302,124, Response filed Jul. 25, 2023 to Final Office Action mailed May 26, 2023", 10 pgs.

"U.S. Appl. No. 17/302,125, Response filed Jul. 31, 2023 to Final Office Action mailed May 31, 2023", 11 pgs.

"U.S. Appl. No. 17/302,124, Advisory Action mailed Aug. 4, 2023", 2 pgs.

"U.S. Appl. No. 17/305,046, Final Office Action mailed Aug. 7, 2023", 10 pgs.

"U.S. Appl. No. 17/305,049, Final Office Action mailed Aug. 8, 2023", 10 pgs.

"U.S. Appl. No. 17/302,125, Advisory Action mailed Aug. 9, 2023", 2 pgs.

Kannan, Kalapriya, "Managing Configuration Complexity during Deployment and Maintenance of SOA Solutions", IEEE International Conference on Services Computing, Bangalore, India, (2009), 152-159.

Tan, Seng Kee, "Dynamically loadable protocol stacks—a message parser-generator implementation", in IEEE Internet Computing, vol. 8, No. 2, (Mar.-Apr. 2004), 7 pgs.

"U.S. Appl. No. 17/302,125, Supplemental Notice of Allowability mailed Feb. 14, 2024", 2 pgs.

"U.S. Appl. No. 17/305,049, Non Final Office Action mailed Mar. 22, 2024", 11 pgs.

"U.S. Appl. No. 17/302,124, Response filed Apr. 15, 2024 to Non Final Office Action mailed Dec. 14, 2023", 11 pgs.

"U.S. Appl. No. 17/302,124, Examiner Interview Summary mailed Apr. 19, 2024", 2 pgs.

"U.S. Appl. No. 17/305,046, Non Final Office Action mailed May 9, 2024", 11 pgs.

"U.S. Appl. No. 17/302,124, Final Office Action mailed May 20, 2024", 12 pgs.

Yao, Zhilin, "An Adaptive Metadata Based Workflow and Data Management System", First International Symposium on Pervasive Computing and Applications, Urumqi, China, (2006), 4 pgs.

"U.S. Appl. No. 17/302,124, Response filed Aug. 20, 2024 to Final Office Action mailed May 20, 2024", 10 pgs.

"U.S. Appl. No. 17/305,049, Final Office Action mailed Oct. 23, 2024", 13 pgs.

"U.S. Appl. No. 17/305,046, Notice of Allowance mailed Oct. 31, 2024", 9 pgs.

"U.S. Appl. No. 17/302,124, Notice of Allowance mailed Jan. 2, 2025", 11 pgs.

"U.S. Appl. No. 17/302,124, Supplemental Notice of Allowability mailed Jan. 8, 2025", 5 pgs.

"U.S. Appl. No. 17/305,049, Examiner Interview Summary mailed Jun. 28, 2024", 2 pgs.

"U.S. Appl. No. 17/305,049, Response filed Jul. 22, 2024 to Non Final Office Action mailed Mar. 22, 2024", 13 pgs.

"U.S. Appl. No. 17/305,046, Response filed Aug. 9, 2024 to Non Final Office Action mailed May 9, 2024", 12 pgs.

"U.S. Appl. No. 17/305,049, Non Final Office Action mailed Apr. 9, 2025", 10 pgs.

"U.S. Appl. No. 17/305,049, Response filed Jul. 9, 2025 to Non Final Office Action mailed Apr. 9, 2025", 11 pgs.

"U.S. Appl. No. 17/305,049, Examiner Interview Summary mailed Jul. 10, 2025", 2 pgs.

* cited by examiner

S310

SYSTEM AND METHOD FOR ENABLING REAL-TIME EVENTING

CROSS-REFERENCE TO RELATED APPLICATIONS

This application is a continuation of U.S. patent application Ser. No. 16/361,925, filed 22-MAR-2019, which is a continuation of U.S. patent application Ser. No. 15/936,670, filed 27 Mar. 2018, which is a continuation of U.S. patent application Ser. No. 14/452,277, filed 05 Aug. 2014, which is a continuation of U.S. patent application Ser. No. 13/170,056, filed 27 Jun. 2011, which claims the benefit of U.S. Provisional Application Ser. No. 61/358,732, filed 25 Jun. 2010, the entirety of all of which are incorporated by reference herein.

TECHNICAL FIELD

This invention relates generally to the internet communication field, and more specifically to a new and useful system and method for enabling real-time eventing in the internet communication field.

BACKGROUND

For many years, web developers and networked applications were limited to a client repeatedly polling a server with a request to receive updated information. In recent years, new mechanisms have been developed to allow a server to notify a client when new events occur. Pubsubhubbub, push notifications, and Comet are a few technologies that have enabled more of a publisher and subscriber relationship between networked clients. However, many publications require multiple publications that may depend on dynamic properties, and subscribers may have additional requirements such that simply receiving event messages from a publisher is unsatisfactory. Thus, there is a need in the internet communication field to create a new and useful system and method for enabling real-time eventing. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Enabling Real-Time Eventing

Figure 1:
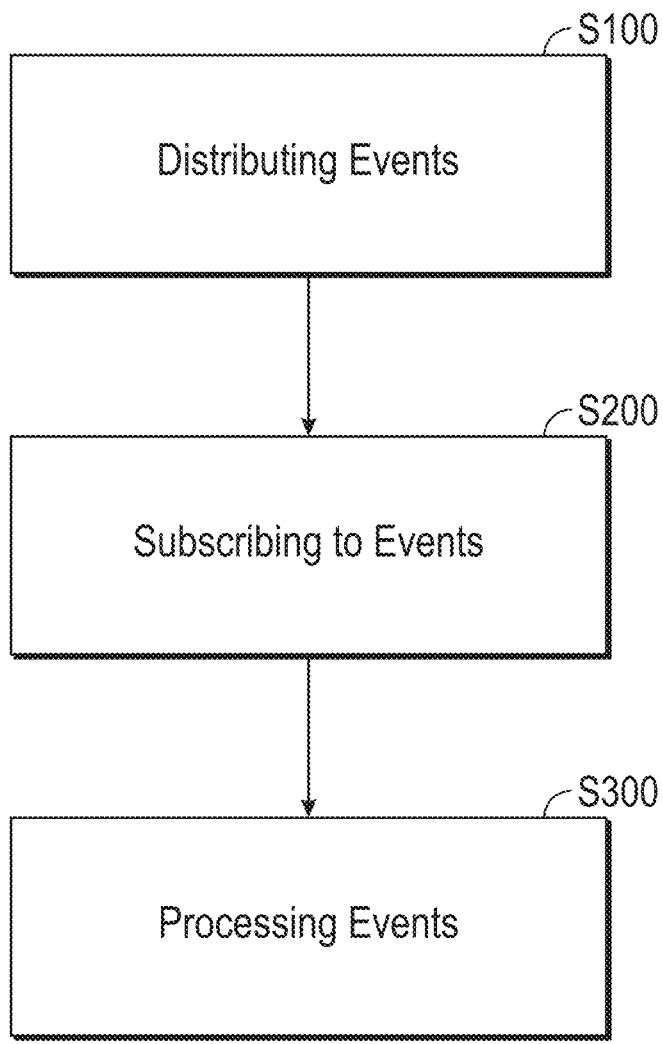
FIG. 1 is a flowchart representation of a method of a preferred embodiment of the invention.

As shown in FIG. 1, a method 100 of a preferred embodiment for enabling real-time eventing preferably includes distributing events S100, subscribing to events S200, and processing events S300. The method 100 functions to provide configurable processing and handling of real-time events. Event channels of an event router preferably have configuration attributes that are preferably accessible through an application programming interface (API), a web interface, or through any suitable interface. Event channels are preferably the event name to which a publisher will publish and a subscriber subscribe. The subscriber may alternatively or additionally specify event attributes or metadata to specify a subscription. This preferably enables events to be configured. At least one of these attributes is preferably a configuration attribute relating to the processing of an event message while passing through the event router. The method is preferably used to enable configurable routing, event delegation, implementation of a webhook, event persistence, alternate or additional routing of events, and/or any suitable event processing step. The event processing is preferably built on top of an event publication and subscription infrastructure. In one preferred application, the publication and subscription infrastructure is integrated with a telephony platform. The method may alternatively be used for any suitable application.

Figure 2:
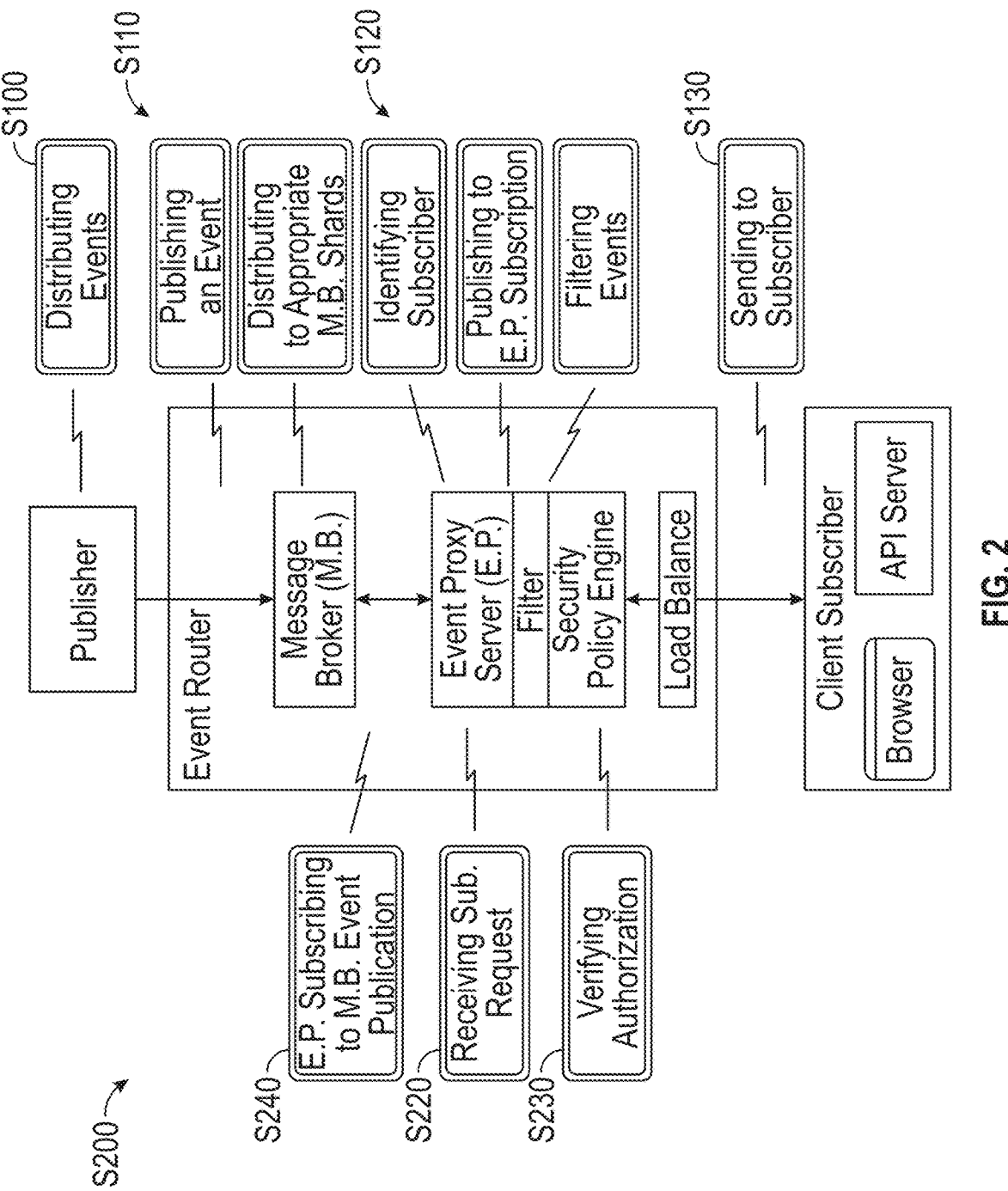
FIG. 2 is a detailed representation of methods of publishing an event and subscribing to an event of a preferred embodiment of the invention.

As shown in FIG. 2, distributing events S100 preferably includes the sub-steps publishing an event to a router S110, identifying subscribers to an event S120, and sending an event to a subscriber S130. As also shown in FIG. 2, subscribing to events S200 preferably includes the sub-steps of generating a signed URL for an event subscription S210, sending an event subscription request to an event router S220, verifying an event subscription S230, and allowing an event subscription S240. Except where noted below, steps S100 and S200 are preferably substantially similar to the method of publishing an event and the method of subscribing to an event as described in U.S. patent application Ser. No. 12/572,258, which is incorporated in its entirety by this reference. Publishing of an event S110 can preferably be published to the event router by any suitable device such as a web server of a web application, a call router for telephony application, client device like a mobile phone, or any suitable networked device. The method may additionally include allocating new resources to the event router. In particular event proxy servers and message brokers may be allocated or deallocated. Additionally, call routers, event distributors, and/or any suitable part or device of the system may be allocated or scaled to accommodate capacity needs. A load balancer may additionally distribute processing across the plurality of components.

The method may additionally include receiving a subscriber generated client event, publishing the client event to the event router and identifying a call router subscribed to a client event, and sending the client event to the call router. These steps function to make the eventing method full duplex for two-way event publication and subscription. The duplex eventing system is substantially similar to the eventing system described, but where the client generates the events and the call router is subscribed to the events. The processing of events may occur for any suitable direction of event messaging.

The method of processing events S300 preferably functions to enhance the handling of an event message during distribution from a publisher to a subscriber. The method of processing events S300 preferably occurs within an event router and may have a number of variations. Method S300 preferably includes substeps of interacting with an configuration attribute S310. The method S300 additionally includes numerous variations of acting on configuration attributes including routing an event message S320, communicating event messages to an external application S330, and/or storing messages S340. Any additional form of processing of a configuration attribute may additionally be performed. Interacting with a configuration attribute and acting on a configuration attribute preferably function to allow functionality and processing of an event to be customizable and flexible for operators of an event. Processing of event messages can preferably be customized for each event with publishers and/or subscribers. This preferably centralized event distribution so publishers only need to publish to a single event that is customized for any suitable distribution setup.

Figure 3:
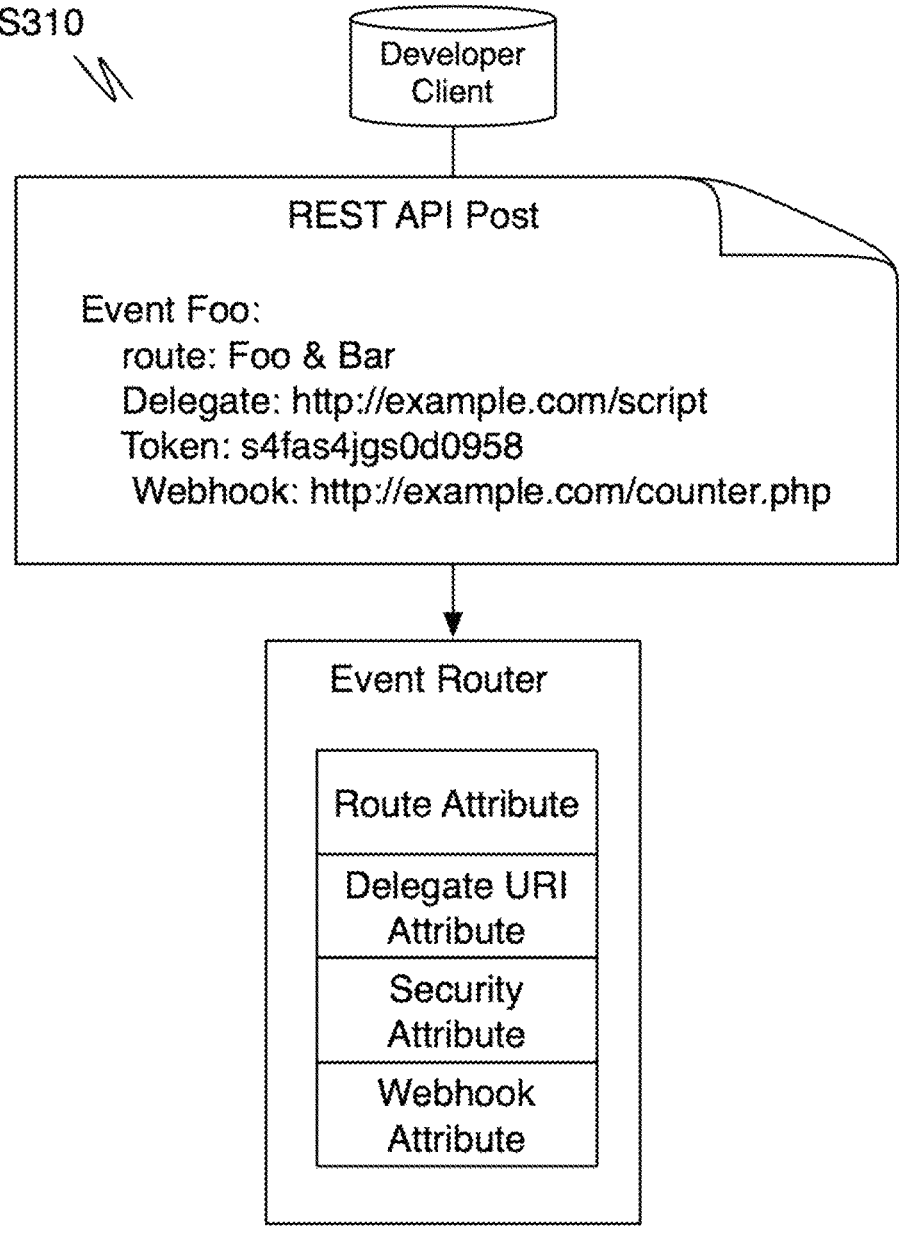
FIG. 3 is a detailed representation of interacting with configuration attributes of a preferred embodiment of the invention.

As shown in FIG. 3, step S310, which includes interacting with configuration attributes, functions to create, read, update, or delete resources of an event. A configuration attribute is preferably a parameter that defines functionality of event distribution. There is preferably a configuration attribute for event routing, a delegate URI, webhook, security, and/or any suitable parameter. The configuration attributes may be stored within the event router, but may alternatively be a resource accessible by the event router. A REST API is preferably used to interact with the configuration attributes, but any suitable interface may alternatively be used such as a simple object access protocol (SOAP). A HTTP message sent to an configuration URI preferably allows outside parties to interact with the configuration attribute. Receiving a POST HTTP message preferably sets a configuration attribute. Receiving a GET HTTP message preferably reads the configuration attribute value. The REST API preferably enables developers to programmatically control configuration attributes. Interacting with the configuration attributes may alternatively be accomplished through a user interface or set in any suitable manner.

Figure 4:
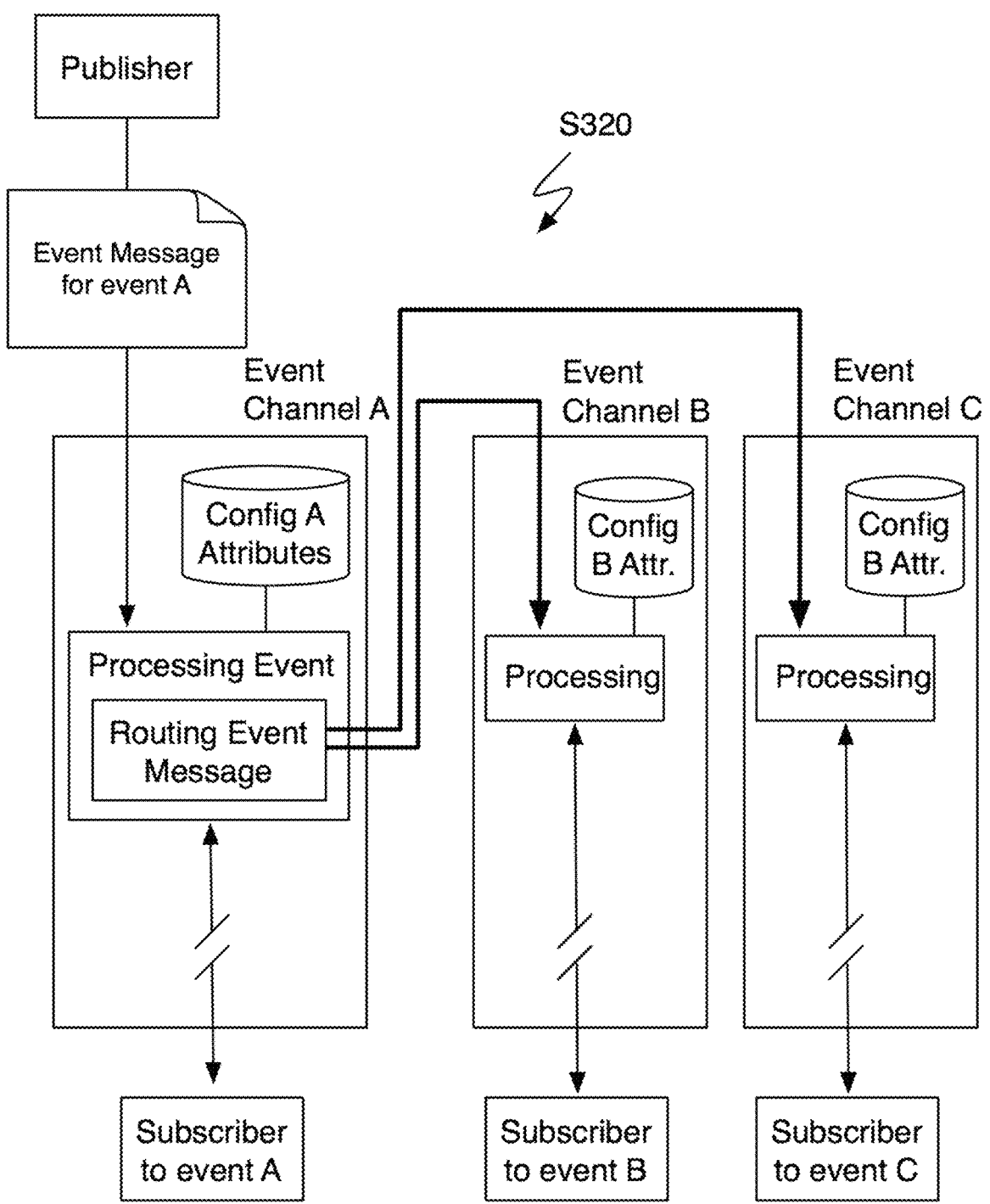
FIG. 4 is a detailed representation of routing an event message of a preferred embodiment of the invention.

As shown in FIG. 4, step S320, which includes routing an event message, functions to direct an event message to a variety of locations. A route preferably specifies where an event message should be published to once the event message is received by an event router. A default route preferably distributes the event message to subscribers of the same event channel. However, a route attribute may be changed so that, an event message is additionally routed to a plurality of event channels and/or subscribers of events. Event messages may alternatively be routed to an event channel different from the actual event channel (i.e., excluding the actual event channel). The event messages may be managed by the event router of the original event but may alternatively be an event on a different event router. One application of routing an event message may be to implement hierarchical event publishing. For example, a child event channel can preferably distribute to all parent event channels by adding a routing to the parent event channel. In this way the parent event channel will receive event messages from all child event channels. Another application of event routing may be to implement routing aliases. For example, a publisher preferably publishes to an event channel A and a subscriber may subscribe to an event channel A', where A' is used as an alias to event channel A. The routing attribute is preferably modified so that event messages published to event channel A are routed to event channel A'. This application preferably gives more control of event distribution to the developer managing the event because the routing can be altered without changing any settings of registered publishers or subscribers. Routing an event message to a new event preferably results in the event message being processed by the second event, where any webhooks, delegate URIs, routing, and/or any suitable processing is preferably executed. Though the event message may alternatively be directly sent to subscribers of the routed event channels without processing the event message according to the configuration attributes of an event channel.

Figure 5:
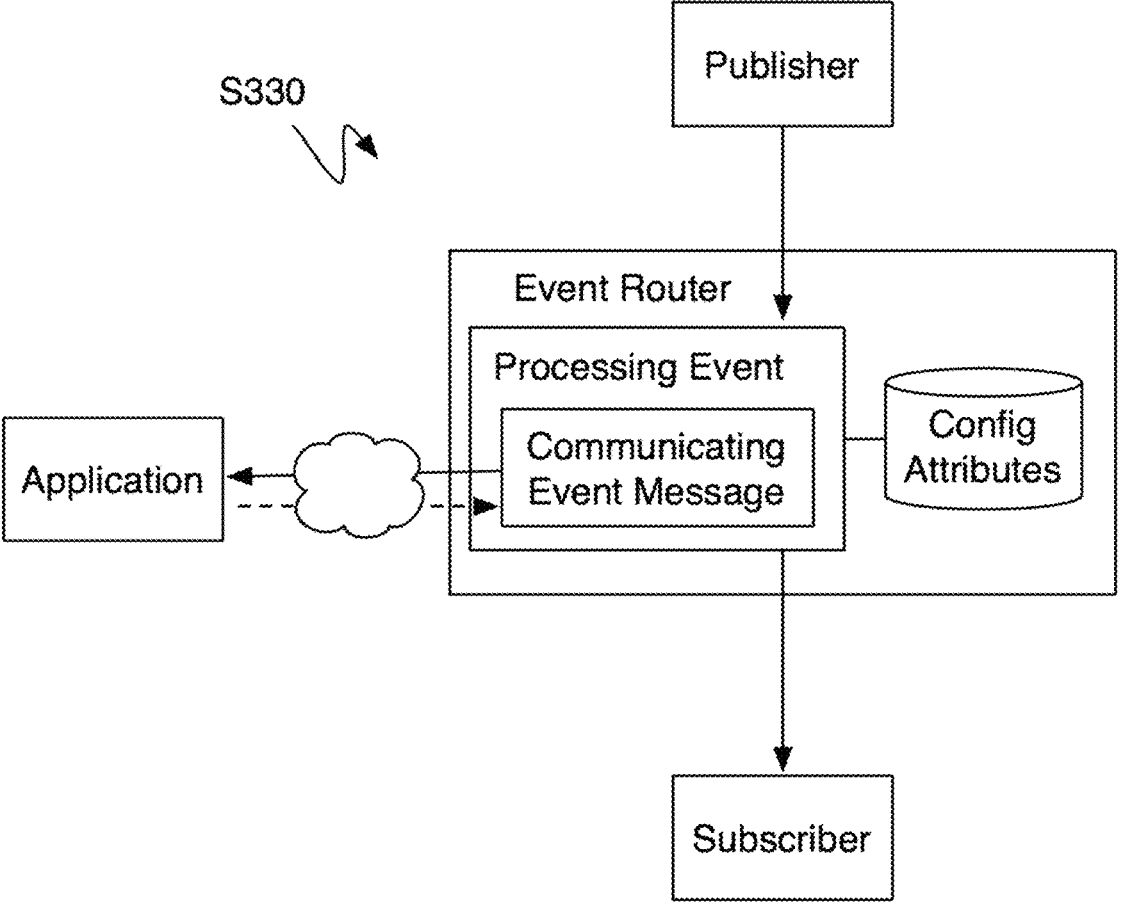
FIG. 5 is a detailed representation of communicating an event message to an application of a preferred embodiment of the invention.

As shown in FIG. 5, step S330, which includes communicating event messages to an application functions to allow outside processing of an event. The application is preferably an external application The outside processing is preferably performed by an application or a script at a remote location specified by a URI. Though the application or script may alternatively be specified by any suitable address or naming scheme. The communication of an event message to an application preferably has at least two variations. A first variation includes passing event handling to a delegate URI 332. A second variation includes triggering a webhook. In both variations, an event message is preferably sent to an external application or script. The application or script may alternatively be an internally controlled application. In the first variation, the application of a delegate URI preferably synchronously performs a task with the event message and then the event router receives an event message in response to the communicated event message. An event message may be altered by the delegate URI. In the second variation, the webhook application preferably performs any suitable task independent of further event processing. This may be asynchronous with the processing of the event message on the event router. An altered event message is not received. The second variation may function to trigger some action outside of event publication. The event message may be sent to any suitable numbers of external applications, and the order of communicating with the applications may additionally be set. For example, an event message may be first sent to a delegate URI, then the modified event message sent to a webhook, and then finally the modified event message is sent to second delegate URI for additional processing.

Figure 6A:
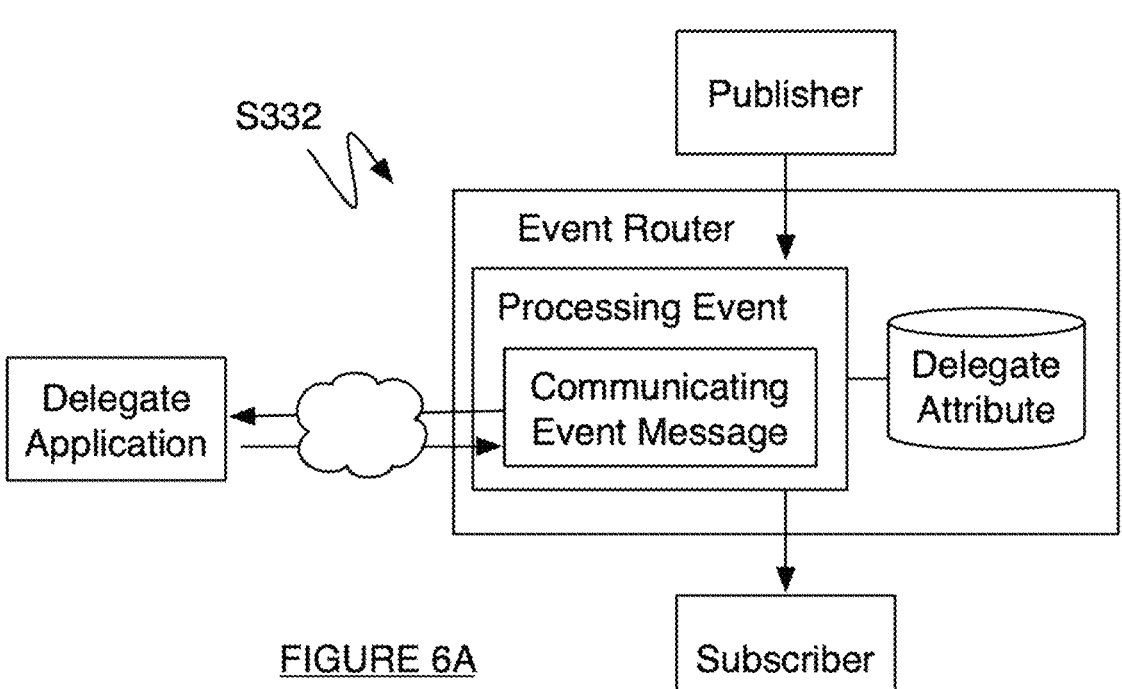
FIGS. 6A and 6B are variations of communicating an event message to an application of a preferred embodiment of the invention.

As shown in FIG. 6A, step S332, which passing event handling to a delegate URI, functions to allow outside processing of an event message before sending to a subscriber. The delegate URI is preferably an outside script or application that operates on the event message prior to distributing the event message. The delegate URI preferably returns a value as the event message to be further processed by the event router. The event message returned is preferably an altered version of the one sent to the delegate URI, but may alternatively be the same as the event message sent to the delegate URI. The delegate URI preferably synchronously operates on the event message, in that the event router preferably waits for a return value. When there are a plurality of delegate URI's the delegate URI's are preferably called in a sequential order, wherein subsequent delegates are sent the processed event message of previous delegates. Delegate URI's may alternatively be called in parallel. The delegate URI may process information from the event message such as data tracking, modifying the contents of the event message, changing or updating event message metadata. For example, a translation service may be setup for a delegate URI that translates an event message to a different language. Another example, a delegate URI may be used to automatically categorize the message through regular expression analysis and set event message metadata. Automatically categorizing an event message preferably enables better filtering of the event messages. Any number and order of delegate URIs may be specified. Event handling may additionally be passed to a delegate URI based on conditional requirements of the event message. In particular, event message metadata may be required to match particular values. For example, event messages with metadata of "language=English" may be processed as normal, but an event message with metadata "language=Spanish" may be passed to a delegate URI that translates Spanish to English. Additionally or alternatively, routing may be used in combination with delegate URIs so that a single event message may be processed and distributed to different events appropriately. Using the example above, the English event messages and translated Spanish event messages may be distributed to a route for English speakers, while the original Spanish event message a translated English event message (that had been passed to a English to Spanish translation delegate URI) are preferably routed to Spanish speakers. In another variation, delegate URI attributes are used to enforce policy. A policy delegate URI preferably returns a message that can be used in the logic of processing the event. Preferably a policy delegate URI is used in allowing or denying processing of an event message. The return value may be particular type of return message or alternatively the response may be added to the metadata of the event message or through any suitable mechanism. Preferably, a policy delegate URI is use to determine if event distribution should be allowed. If the response includes a failure response then halting or any suitable action is preferably halted. The policy delegate URI in this may be used to provide security, validating the message is authorized for distribution. A plurality of policy delegate URI's may additionally be used in parallel. The plurality of responses from the policy delegate URI's may be used to make a decision in event processing.

Figure 6B:
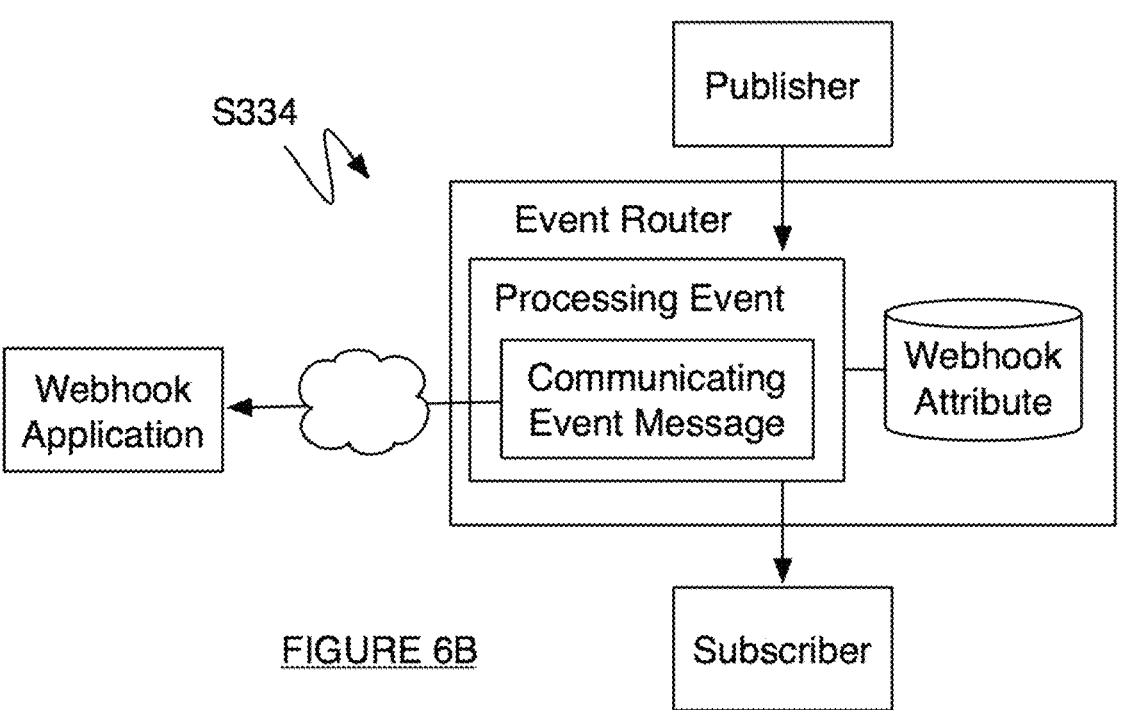

As shown in FIG. 6B, step S334, which includes triggering a webhook during event publication, functions to message an application or script that wishes to be notified of the occurrence of the event. The webhook configuration attribute is preferably an outside URI, but may alternatively be any suitable address or name alias. The notification caused by the webhook preferably causes some action by the application. When a webhook attribute has a URI specified, the event message is preferably sent to that URI on the occurrence of an event message. A webhook, may be used to create an external log of events, may trigger some event in a client, or perform any suitable action. The webhook application preferably does not reply to the event router with the event message, but the application may respond with a confirmation of the event message communication having been received. The event router preferably continues processing the event message after sending triggering the webhook since processing of the event message is not dependent on the actions of the webhook application.

Figure 7:
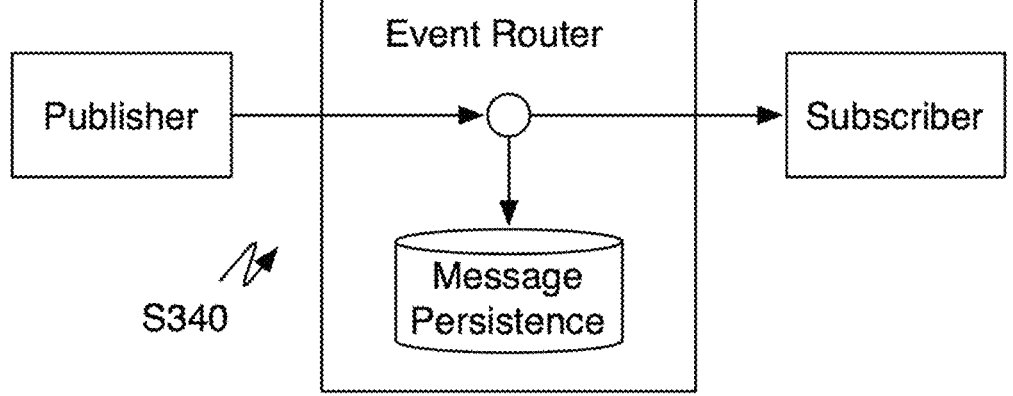
FIG. 7 is a detailed representation of storing an event message of a preferred embodiment of the invention.

As shown in FIG. 7, step S340, which includes storing messages, functions to create an accessible event message history. Messages are preferably stored in a database. And the event messages are preferably accessible through a REST API or through any suitable interface. Event message metadata may additionally be stored with the event message.

The original event messages are preferably stored but alternatively event messages after processing by a delegate URI may be stored. The messages can preferably be retrieved or queried based on properties such as event message content, metadata, date/time, or any suitable properties. Stored messages can preferably be used by developers to create chat clients, content feeds, or any suitable collection of messages.

Figure 8:
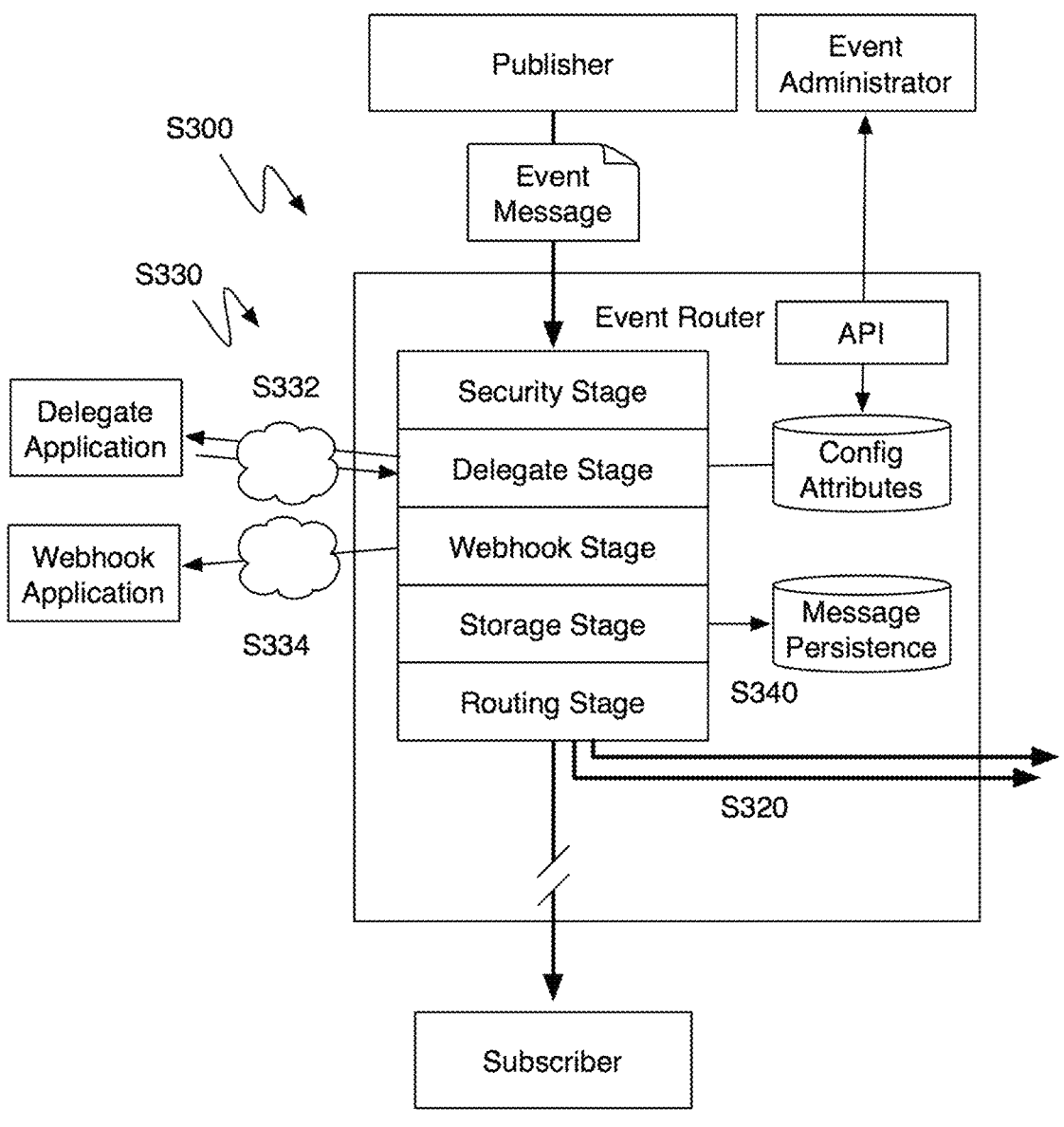
FIG. 8 is an exemplary sequence of processing an event message.

The processing of an event message by an event router may be configured in a number of various ways. Preferably, the processing of an event is a fixed sequence of operations. Each type of processing (e.g., communicating with a delegate URI, routing, etc.) preferably is performed in a set sequence. This sequence may have numerous variations. As shown in FIG. 8, one variation preferably is a set order of validating security for the event message, sending the event message to delegate URI, storing event message in persistent storage, triggering any webhooks, routing the event to other events, and then allowing the event message to continue with publication to a subscriber (if the routing calls for this). This order of processing stages may alternatively have any suitable order. A stage of processing may additionally be performed numerous times. For example, a plurality of delegate URI configuration attributes may be set. Each of the delegate URIs is preferably called sequentially. Any suitable protocol or convention may be used to determine the order of multiple iterations of a stage. Alternatively, the processing of an event may be fully or partially configurable. The ordering of the event processing steps may be determined by a parameter of a processing attribute. In this alternative, a portion of the steps or all the steps may be configured through an API to be performed in a certain order according to the preferences of the administrator of the event. For example, one application may call for routing to occur before sending to a delegate URI, and a second application may call for routing to occur after sending the event message to a delegate URI.

2. System for Enabling Real-Time Eventing

Figure 9:
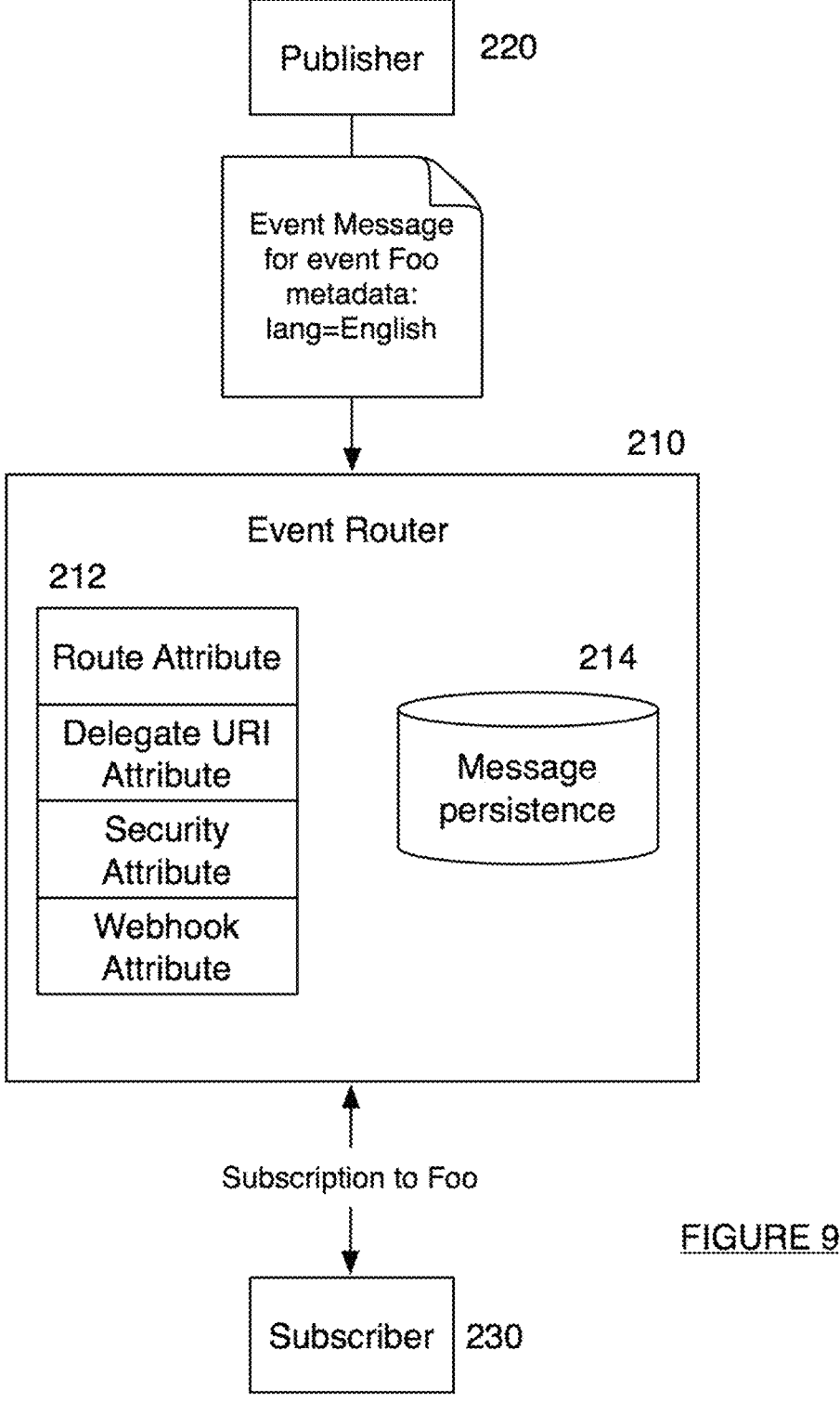
FIG. 9 is a schematic representation of a system of a preferred embodiment of the invention.

As shown in FIG. 9, a system 200 for enabling real-time eventing of a preferred embodiment includes an event router 210, a publisher 220, and a subscriber 230. The system 200 functions to create a framework for which events can be distributed to interested parties. The system preferably allows events to be processed and distributed in nearly real-time. Subscribers, parties interested in content of a publisher, preferably do not have to poll the publisher to check for event information. The system functions to actively send events to interested parties. The system may be used in any suitable application such as web applications, telephony network communications, online gaming, content feeds, chat clients, or any suitable application. The event router preferably includes configuration attributes that preferably enable the system 200 to handle event processing, perform complex event routing, and trigger event actions.

Figure 10:
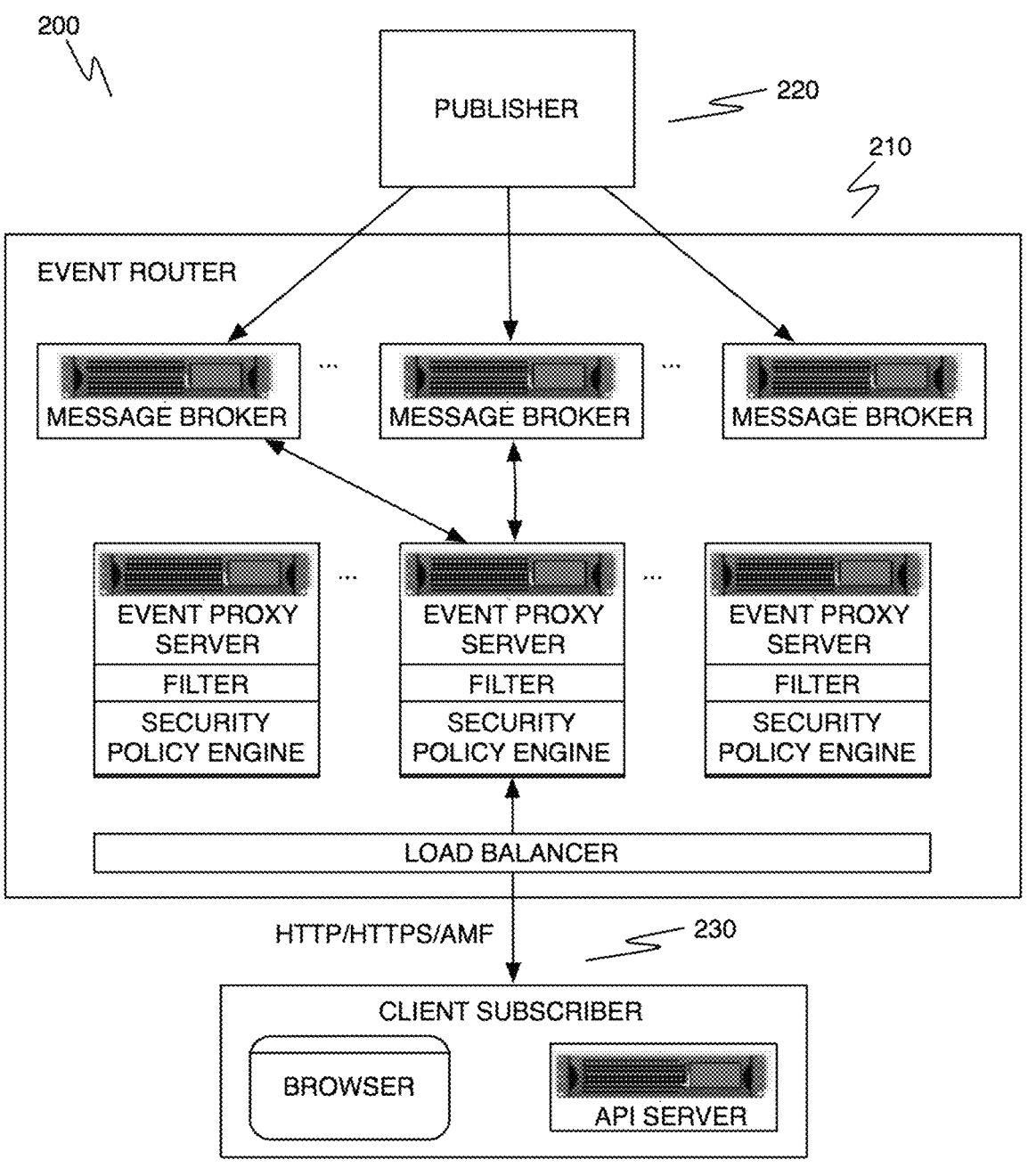
FIG. 10 is a detailed schematic representation of preferred embodiment of the invention.

An event router 210 of the preferred embodiment functions to maintain state of the publication and subscription (pub/sub) channel and manage distributing event messages. The subscriber 230 preferably registers a subscription to a particular event with the event router 210, and a publisher preferably 220 publishes content to a particular event channel on the event router 210. When the publisher publishes content in the form of an event message, the event router 210 preferably distributes the event message to all subscribers of the event. Preferably, the published event message is pushed to subscribers through an open HTTP connection (a single continuous HTTP connection). The open HTTP connection functions to simplify software of a web application using the system. Alternatively, the connection may push data with HTTPS, intermittent HTTP/HTTPS connections, AMF Channel, TCP connection, UDP connection, chat protocols such as jabber, or any suitable messaging framework. In one embodiment, as shown in FIG. 10, the event router 210 preferably includes an event proxy server and/or a message broker. The event proxy server preferably manages the subscriptions from a subscriber 220 (i.e., a client) and/or performs more computational intensive processes like filtering events and security. The message broker preferably manages the publications and more preferably manages a subset of event publications from the publisher. The event proxy server is preferably part of a cluster of event proxy servers that can be dynamically scaled to satisfy capacity requirements. The message broker is preferably part of a cluster of message brokers that can similarly be dynamically scaled to satisfy capacity requirements. A load balancer may additionally be included within the event router 220 to manage the capacity load of the various components (e.g., the event proxy servers 222 and the message brokers 228). A plurality of load balancers may be individually implemented for each component type, or a single load balancer may manage the event router 220. The event router 210 is preferably substantially similar to U.S. patent application Ser. No. 12/572,258, filed on 1 Oct. 2009 and entitled, "Telephony Web Event System and Method", which is incorporated in its entirety by this reference. However, the event router may have any alternative design.

Additionally, the event router 210 preferably includes configuration attributes 212. Configuration attributes are preferably parameters of the event that may affect event behavior, manage subscribers and/or subscribers, and/or manage any suitable parameter of the event router 210. Configuration attributes 212 are preferably stateful resources stored within the event router 210 or alternatively accessible by the event router 210. The configuration attributes are preferably accessible through a representational state transfer (REST) application protocol interface (API). The event router additionally preferably includes an event message persistence 214, which functions as a record of event messages.

Configuration attributes 212 preferably function as readable or editable parameters that define functionality of event distribution. The configuration attributes 212 may be used as processing resources that impact event message processing. The configuration attributes are preferably RESTful resources in that the configuration attributes preferably have an associated URI that can receive HTTP messages. There is preferably a plurality of various configuration attributes that may be used with an event such as a route attribute, permissions attribute, a webhook attribute, a delegate URI attribute, or any suitable attribute. A route attribute preferably functions to define routing of an event message to additional events. A route may be defined to direct event messages to any suitable event or number of events. For example a route for event A may be defined so that event messages are additionally directed to event B. A permissions attribute may define security measures to control the publication and/or subscription of events. The permissions attribute may include security tokens that are used to validate subscribers or publishers. A webhook attribute preferably defines a URI that is sent a HTTP callback when an event message is received. The webhook URI functions to create even more flexibility in the sub/pub paradigm, where events can cause server actions through webhook mechanisms. A delegate URI attribute preferably defines a URI that is passed an event message prior to distributing the event message to subscribers. A delegate URI functions to enable outside processing of an event. The resource at the delegate URI is preferably a script or application that modifies the event message but may alternatively be reading the event message or using the event message in any suitable fashion. One example of a delegate URI may be a translation service that translates event messages to a different language prior to distribution to subscribers. There may additionally be a processing attribute or attributes that determine the ordering and configuration of the processes associated with the other configuration attributes. For example, an event may require an event message to be routed to a second event and then translated by a delegate URI (such that the second event does not receive the translated event message). While another event may require an event message to first be translated by a delegate URI and then routed. As an alternative, the configuration for processing an event may be set through a convention.

Message persistence 214 preferably functions to be an accessible record of past event messages. The message persistence is preferably a database of previous event messages. All event messages are preferably stored but event messages may alternatively be stored for certain amount of time or the message persistence 214 may store a particular number of event messages or particular portion of an event message. A record of event message may additionally store event message metadata as described below. The message persistence is preferably queryable.

The event router 210 preferably includes a configured order to the processing of an event message. In one preferred variation shown in FIG. 8, the event router initially uses a security attribute to verify that the event message is sent from an authenticated publisher. This may include verifying through a secret key shared between at least the publisher and the event router. Next, a delegate URI configuration attribute is retrieved and the event message is sent to the specified delegate URI. The application or script at the delegate URI preferably processes the event message. While processing, the event message may be altered. The event router preferably waits for a response from the delegate. This is preferably repeated for any suitable number of delegate URI configuration attributes. Next the event message is preferably stored within the message persistence 214. At substantially the same time or either before or after storing the event message, a webhook configuration attribute is preferably retrieved. The event message is preferably sent to the URI of the webhook configuration attribute. Then a routing configuration attribute is preferably retrieved, and the event message is routed to the specified event(s) in the routing configuration attribute. In the above cases, a process is preferably not performed if no configuration attribute is set for the associated process. The event router 210 may alternatively have any suitable layout/ordering. For example, routing may occur before sending an event message to a delegate URI.

The publisher 220 of the preferred embodiment functions to create event messages for distribution. The publisher 220 may be any suitable networked device. The publisher may be a web server of a web application, a call router for telephony application, client device like a mobile phone, or any suitable networked device. The publisher is preferably registered with the event router 210 to know what events the publisher will be publishing. The publisher preferably creates an event message when the publisher 220 wants to notify subscribers of an event. The event message as described above preferably includes the event related message, which may include text, media, and/or any suitable data. The event message may additionally include event message metadata such as the category of the event message. The event message may additionally include a security token that functions to authenticate the identity of the publisher 220 and prevent others from posing as the publisher 220.

Event message metadata is preferably any suitable contextual data related to an event message. The event message metadata is preferably used by publishers 220, subscribers 230, and the event router 210 to more finely define functionality of event distribution. Event message metadata preferably describes message category, a tag, location information, time, author, mediatype, language, source, and/or any suitable metadata related to a particular event message. The metadata is preferably used for filtering event messages for a subscriber. For example, a subscriber may subscribe to an event called "news", but only want to be notified of event messages that have the metadata event attribute of "tag=San Francisco". Functionality of event attributes may additionally be conditionally enabled for event messages with particular metadata. Event routing, delegate URIs, and webhooks may only be used if metadata satisfy set conditions.

The subscriber 230 of the preferred embodiment functions to receive event messages from the event router 210. The subscriber preferably registers with the event router 210 to receive notifications of a particular event. The subscriber may additionally setup any suitable forms of filters for receiving event messages. Any suitable Boolean logic may be used with event messages and attributes to determine which event messages a subscriber 230 receives.

An alternative embodiment preferably implements the above methods in a computer-readable medium storing computer-readable instructions. The instructions are preferably executed by computer-executable components such as an event router. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable hardware device.

As a person skilled in the art will recognize from the previous detailed description and from the figures and claims, modifications and changes can be made to the preferred embodiments of the invention without departing from the scope of this invention defined in the following claims.

We claim:

1. A system comprising:
one or more computer processors;
one or more computer memories;
a set of instructions stored in the one or more computer memories, the set of instructions configuring the one or more computer processors to perform operations comprising:
handling one or more configuration attributes associated with an event message after the event message has been published by a publisher, the handling of the one or more configuration attributes including passing the event message to a plurality of delegate URIs configured to add event metadata to the event message, or, remove or modify event metadata previously associated with the event message, wherein a configuration attribute of the one or more configuration attributes determines whether the plurality of delegate URIs process the event message and event metadata sequentially or in parallel;
accessing the event metadata associated with the event message;

based on a matching of the event metadata to one or more values, passing the event message to an additional delegate URI, the additional delegate URI automatically updating metadata associated with the event message, the updating of the metadata causing the event message to be filtered out from at least one subscriber from a plurality of subscribers to the event message based on an evaluation of the updated event metadata against one or more criteria previously provided by the at least one subscriber; and
distributing the event message to the plurality of subscribers excluding the at least one filtered out subscriber.

2. The system of claim 1, wherein the evaluation of the event metadata includes determining that the event metadata does not include one or more of a category, a tag, a location, a time, an author, a media type, a language, or a source specified by the at least one subscriber.

3. The system of claim 1, further comprising conditionally enabling one or more event attributes associated with the event message based on the event metadata.

4. The system of claim 3, wherein the one or more event attributes include one or more of a routing attribute, a delegate attribute, or a webhook attribute.

5. The system of claim 1, wherein the filtering is performed by an event proxy server and the distributing of the event message is performed by a message broker.

6. The system of claim 1, further comprising categorizing the event message.

7. The system of claim 6, wherein the categorizing of the event message is performed by using a delegate to perform the categorizing automatically through regular expression analysis.

8. A method comprising:
handling one or more configuration attributes associated with an event message after the event message has been published by a publisher, the handling of the one or more configuration attribute attributes including passing the event message to a plurality of delegate URIs configured to add event metadata to the event message, or remove or modify event metadata previously associated with the event, wherein a configuration attribute of the one or more configuration attributes determines whether the plurality of delegate URIs process the event message and event metadata sequentially or in parallel;
accessing the event metadata associated with the event message;
based on a matching of the event metadata to one or more values, passing the event message to an additional delegate URI, the additional delegate URI automatically updating metadata associated with the event message, the updating of the metadata causing the event message to be filtered out from at least one subscriber from a plurality of subscribers to the event message based on an evaluation of the updated event metadata against one or more criteria previously provided by the at least one subscriber; and
distributing the event message to the plurality of subscribers excluding the at least one filtered out subscriber.

9. The method of claim 8, wherein the evaluation of the event metadata includes determining that the event metadata does not include one or more of a category, a tag, a location, a time, an author, a media type, a language, or a source specified by the at least one subscriber.

10. The method of claim 8, further comprising conditionally enabling one or more event attributes associated with the event message based on the event metadata.

11. The method of claim 10, wherein the one or more event attributes include one or more of a routing attribute, a delegate attribute, or a webhook attribute.

12. The method of claim 8, wherein the filtering is performed by an event proxy server and the distributing of the event message is performed by a message broker.

13. The method of claim 8, further comprising categorizing the event message.

14. The method of claim 13, wherein the categorizing of the event message is performed by using a delegate to perform the categorizing automatically through regular expression analysis.

15. A non-transitory computer-readable storage medium storing a set of instructions that, when executed by one or more computer processors, causes the one or more computer processors to perform operations comprising:

handling one or more configuration attributes associated with an event message after the event message has been published by a publisher, the handling of the one or more configuration attributes including passing the event message to a plurality of delegate URIs configured to add event metadata to the event message, or, remove or modify event metadata previously associated with the event message, wherein a configuration attribute of the one or more configuration attributes determines whether the plurality of delegate URIs process the event message and event metadata sequentially or in parallel;

accessing the event metadata associated with the event message;

based on a matching of the event metadata to one or more values, passing the event message to an additional delegate URI, the additional delegate URI automatically updating metadata associated with the event message, the updating of the metadata causing the event message to be filtered out from at least one subscriber from a plurality of subscribers to the event message, based on an evaluation of the updated event metadata against one or more criteria previously provided by the at least one subscriber; and distributing the event message to the plurality of subscribers excluding the at least one filtered out subscriber.

16. The non-transitory computer-readable storage medium of claim 15, wherein the evaluation of the event metadata includes determining that the event metadata does not include one or more of a category, a tag, a location, a time, an author, a media type, a language, or a source specified by the at least one subscriber.

17. The non-transitory computer-readable storage medium of claim 15, further comprising conditionally enabling one or more event attributes associated with the event message based on the event metadata.

18. The non-transitory computer-readable storage medium of claim 17, wherein the one or more event attributes include one or more of a routing attribute, a delegate attribute, or a webhook attribute.

19. The non-transitory computer-readable storage medium of claim 15, wherein the filtering is performed by an event proxy server and the distributing of the event message is performed by a message broker.

20. The non-transitory computer-readable storage medium of claim 15, further comprising categorizing the event message.

* * * * *